June 1, 1954  H. E. THEBODEAU  2,679,697
GAUGE FOR MACHINE SCREWS
Filed Oct. 21, 1952

INVENTOR.
Henry E. Thebodeau.
BY
ATTORNEYS.

UNITED STATES PATENT OFFICE 2,679,697

GAUGE FOR MACHINE SCREWS

Henry E. Thebodeau, Long Beach, Calif.

Application October 21, 1952, Serial No. 316,108

2 Claims. (Cl. 33—199)

(Granted under Title 35, U. S. Code (1952), sec. 266)

The invention described herein may be manufactured and used by or for the Government of the United States of America for governmental purposes without the payment of any royalties thereon or therefor.

This invention relates to a gauge for determining certain characteristics of standard machine screws.

In a preferred form of the invention, the gauge is formed with a plurality of tapped holes; the user finds a hole into which the screw in question fits, and thereupon reads, from the scales on the gauge, the wire size of the screw and number of threads per inch. The tap drill size may also be determined in the same operation.

An object of the invention is to provide a single gauge which will in one operation supply the data usually obtainable only by a plurality of operations and with the use of a plurality of gauges.

Other objects and many of the attendant advantages of this invention will be readily appreciated as the same becomes better understood by reference to the following description.

Figure 1:
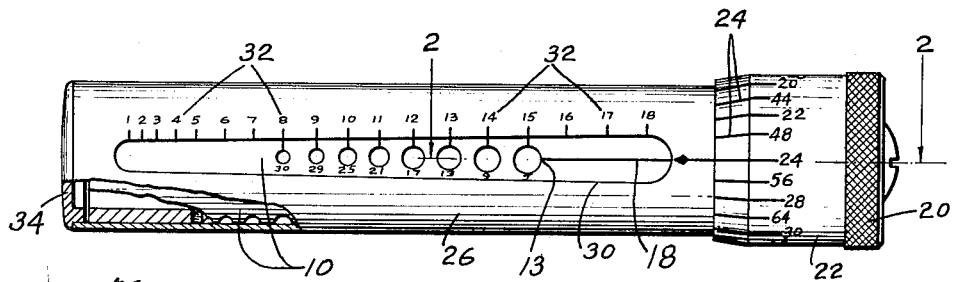
Fig. 1 is a view in longitudinal elevation, with parts broken away, of a device embodying the invention.
Figure 2:
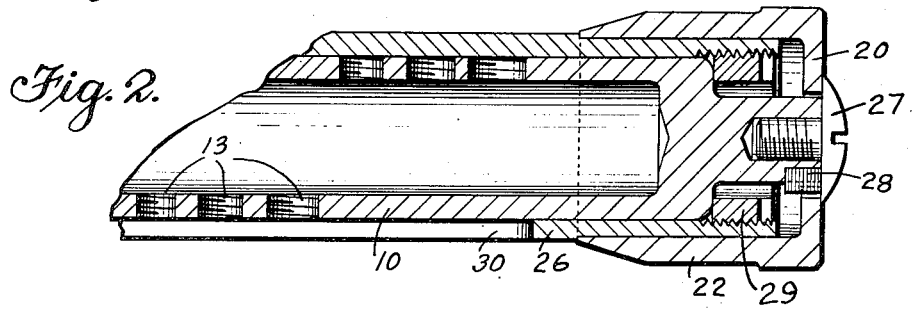
Fig. 2 is an enlarged sectional view taken on the line 2—2 of Fig. 1.
Figure 3:
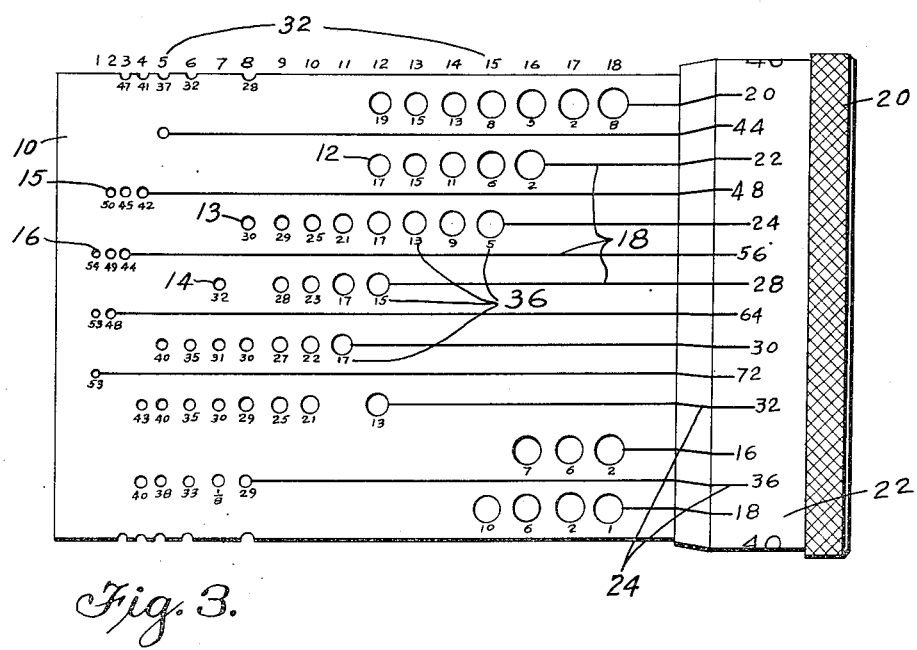
Fig. 3 is a developed view of the barrel shown in Fig. 1.

The gauge shown in the drawing comprises a hollow cylindrical barrel 10 having formed therein several longitudinal rows of tapped holes, including the rows designated at 12, 13, 14, 15 and 16, located along longitudinal lines 18. The holes of each row are of graduated diameter but of identical screw pitch; for example, all holes of row 12 may have 22 threads to the inch; row 13, 24 threads; row 14, 28 threads; row 15, 48 threads; and row 16, 56 threads. Likewise, the holes of different rows which are equidistant from the flange 24 are of the same diameter but have different thread pitches.

At one end, barrel 10 has fixedly secured thereto by means of a screw 27 and a key 28 a cap 20 formed with a forwardly extending flange 22 which may be calibrated as indicated at 24 to indicate threads per inch. Surrounding the barrel 10 is a shouldered sleeve 26 which is held in rotatable relation to the barrel and to flange 22 by a ring 29 which threadedly engages the threaded inner bore of the sleeve. The sleeve 26 is formed with a slot 30 which tapers in the forward direction and is marked with graduations and numerals 32 to read in wire-sizes of screws. The forward end of the gauge may be provided with any suitable type of bearing, such as those commonly used in micrometers, and indicated generally by the reference numeral 34. In addition, the drill sizes corresponding to the different-size holes may be stamped upon the sleeve 26 adjacent the holes, as indicated at 36.

In the operation of the device, the user having a screw of unknown characteristics inserts it into any hole of the same diameter, a matter which can be judged approximately by eye. He then tries to thread it into that hole, and if it will not fit, he rotates flange 22, and thereby the barrel 10, to bring another row of holes into registry with slot 30 and tries the corresponding hole of that row. This process is continued until he finds a hole into which the screw can be threaded. A reading of the graduation 32 which is in line with that hole then gives him the wire size, and a reading of the graduation 24 which is in line with the slot 30 gives him the threads per inch, while a reading of the indicia 36 gives him the tap drill size. From this information the clearance drill size may be readily determined in known manner.

Obviously many modifications and variations of the present invention are possible in the light of the above teachings. It is therefore to be understood that within the scope of the appended claims the invention may be practiced otherwise than as specifically described.

What is claimed is:

1. Apparatus for gauging screw sizes comprising a barrel formed with a plurality of lines parallel to the axis thereof, a plurality of rows of tapped holes centered on said lines progressively increasing in size, each of said holes on a line having the same thread pitch, holes of the same diameter on said lines being aligned circumferentially, a flange fixed to said barrel and concentric therewith, indicia on said flange indicating the thread pitch of the holes in each row, a tubular sleeve rotatably mounted circumjacent said barrel and extending beneath said flange and having a longitudinal tapered slot therein, and indicia on said sleeve adjacent said slot corresponding to the diameter of said holes exposed by said slot.

2. Apparatus for gauging screw sizes comprising a barrel having a plurality of lines parallel to the axis thereof, a plurality of tapped holes centered on said lines progressively increasing in size, each of said holes on a line having the same thread pitch while the holes of the same diameter on the several lines are circumferentially aligned with each other, a flange fixed to said barrel in spaced concentric relation thereto, indicia on said flange indicating the thread pitch of the holes in each row, a sleeve rotatably mounted on said barrel and extending adjacent said flange, said sleeve being formed with a tapered longitudinal slot designed to expose one row at a time, and indicia on said sleeve adjacent said slot indicating the diameters of the holes exposed by said slot.

References Cited in the file of this patent

UNITED STATES PATENTS

| Number | Name | Date |
|---|---|---|
| 320,976 | Shedlock | June 30, 1885 |
| 1,989,353 | Davis | Jan. 29, 1935 |
| 2,475,450 | Dvorak | July 5, 1949 |
| 2,579,832 | Kinch | Dec. 25, 1951 |

FOREIGN PATENTS

| Number | Country | Date |
|---|---|---|
| 593,289 | France | Aug. 20, 1925 |

OTHER REFERENCES

Publication: Stewart Screw and Nut Locator, Stewart Mfg. Co., Washington 9, D. C. Rec'd. in Div. 66 January 7, 1947.

American Machinist, April 22, 1948, page 73, article entitled "For Duplicate Measuring, etc." (Copy in Div. 66.)